United States Patent [19]

Negishi et al.

[11] Patent Number: 5,168,539
[45] Date of Patent: Dec. 1, 1992

[54] FIBER-OPTIC COIL AND METHOD OF MANUFACTURING SAME

[75] Inventors: Hidehiko Negishi, Kawasaki; Yoshinori Takeuchi; Yukio Kasahara, both of Tokyo; Yoshihiko Honjoya, Kawasaki, all of Japan

[73] Assignee: Matsushita Electric Industrial Co., Ltd., Osaka, Japan

[21] Appl. No.: 800,041

[22] Filed: Nov. 29, 1991

[30] Foreign Application Priority Data

Nov. 28, 1990 [JP] Japan ............ 2-332396
Nov. 28, 1990 [JP] Japan ............ 2-332399
Nov. 28, 1990 [JP] Japan ............ 2-332400
Nov. 28, 1990 [JP] Japan ............ 2-332401

[51] Int. Cl.⁵ ............................ G02B 6/16
[52] U.S. Cl. .................... 385/123; 356/350; 242/18 A; 385/147
[58] Field of Search ........ 385/123, 134, 147; 242/18 A; 356/350

[56] References Cited

U.S. PATENT DOCUMENTS

| | | | |
|---|---|---|---|
| 4,781,461 | 11/1988 | Baron et al. | 356/350 |
| 4,856,900 | 8/1989 | Ivancevic | 356/350 |
| 5,074,665 | 12/1991 | Huang et al. | 356/350 |

FOREIGN PATENT DOCUMENTS

| | | | |
|---|---|---|---|
| 0242315 | 12/1985 | Japan | 356/350 |
| 60-242315 | 12/1985 | Japan . | |
| 61-48715 | 3/1986 | Japan . | |
| 61-296211 | 12/1986 | Japan . | |

OTHER PUBLICATIONS

"Thermally Induced Nonreciprocity in the Fiber-Optic Interferometer" by D. M. Shupe; Applied Optics, vol. 19, No. 5, Mar. 1, 1980.

Primary Examiner—John D. Lee
Assistant Examiner—S. W. Barns
Attorney, Agent, or Firm—Pollock, VandeSande & Priddy

[57] ABSTRACT

A fiber-optic coil for use as the sensor loop of a fiber-optic gyroscope includes a first optical fiber segment wound as radially successive coiled layers around a coil bobbin in a first region thereof, and a second optical fiber segment wound as radially successive coiled layers around the coil bobbin in an axially adjacent second region thereof. The first and second optical fiber segments are joined to each other through a longitudinal middle portion, which is positioned in the radially innermost coiled layers of the first and second optical fiber segments adjacent to a longitudinal center of said coil bobbin. Each of the first and second optical fiber segments is wound in alternate axial directions in the radially successive coiled layers. The first and second optical fiber segments may be integrally joined to each other by the longitudinal middle portion, or may be separate from, but joined to, each other by a depolarizer across the longitudinal middle portion.

17 Claims, 6 Drawing Sheets

FIBER-OPTIC COIL AND METHOD OF MANUFACTURING SAME

BACKGROUND OF THE INVENTION

1. Field of the Invention

The present invention relates to a fiber-optic coil and a method of manufacturing such a fiber-optic coil, and more particularly to a coil of fiber-optic layers wound on a bobbin, for use as the sensor loop of a fiber-optic gyroscope, for example, and a method of manufacturing such a fiber-optic coil.

2. Description of the Prior Art

Fiber-optic sensors find various applications as they are highly sensitive, small in size, light in weight, and highly resistant to environmental changes. One typical use of such a fiber-optic sensor is as a sensor coil in a fiber-optic gyroscope for detecting the angular rate of a moving object. For increased detection sensitivity, the sensor coil comprises a multiplicity of coiled fiber-optic layers that provide an increased area surrounded by the optical fiber. However, it is known that since the optical fiber is coiled in a number of layers, the optical fiber is subject to different temperatures at different portions therealong, resulting in a reduction in the measurement accuracy.

Various methods have been proposed to wind an optical fiber in a symmetric pattern around a coil bobbin for minimizing temperature differences along the optical fiber.

Before a continuous length of optical fiber is coiled around a coil bobbin, it is temporarily wound as first and second segments of equal length on respective supply bobbins, the first and second segments being divided at the center of the optical fiber length.

According to one method, the first optical fiber segment is supplied from its supply bobbin and starts being wound, from the optical fiber center, on a coil bobbin as successive turns from one axial end of the coil bobbin. After a predetermined number of turns of the first optical fiber segment have been wound on the coil bobbin, the second optical fiber segment is supplied from its supply bobbin and starts being wound, from the optical fiber center, on the coil bobbin over the coiled layer of the first optical fiber segment. When the coiled layer of the second optical fiber segment reaches the end of the coiled layer of the first optical fiber segment, the second optical fiber segment starts being wound directly on the coil bobbin axially beyond the coiled layer of the first optical fiber segment.

After a predetermined number of turns of the second optical fiber segment have been wound directly on the coil bobbin, the first optical fiber segment starts to be wound on the coil bobbin over the coiled layer of the second optical fiber segment. In this manner, the first and second optical fiber segments are wound alternately over their coiled layers toward the other axial end of the coil bobbin. After the coil bobbin is fully covered with the first coiled layers, second layers of the first and second optical fiber segments are alternately wound over the first coiled layers toward the starting axial end of the coil bobbin. The above winding process is repeated until the coil bobbin is coiled with a desired number of fiber-optic layers.

According to another winding process, the first optical fiber segment is supplied from its supply bobbin and starts being wound, from the optical fiber center, on a coil bobbin as successive turns from one axial end of the coil bobbin all the way toward the other axial end thereof. After the first optical fiber segment has been wound as a coiled layer on the coil bobbin, the second optical fiber segment is supplied from its supply bobbin and starts being wound, from the optical fiber center, on the coil bobbin over the coiled layer of the first optical fiber segment from the other axial end of the coil bobbin all the way toward the starting axial end of the coil bobbin. When the coiled layer of the second optical fiber segment reaches the starting axial end of the coil bobbin, the second optical fiber segment is wound again over its own coiled layer from the starting axial end of the coil bobbin all the way toward the other axial end thereof.

Thereafter, the first optical fiber segment is wound as two successive layers over the coiled layers of the second optical fiber segment in the same manner as the second optical fiber segment was wound. In this manner, two successive coiled layers of the first optical fiber segment and two successive coiled layers of the second optical fiber segment are alternately wound on the coil bobbin. The above winding process is repeated until the coil bobbin is coiled with a desired number of fiber-optic layers.

However, the conventional winding processes have been complex, time-consuming, and unable to produce fiber-optic coils with a high yield. In addition, since the first and second optical fiber segments are alternately coiled in each fiber-optic layer or different fiber-optic layers, they are twisted and strained, resulting in an undue degradation of their optical propagation characteristics or damage to their own mechanical properties.

SUMMARY OF THE INVENTION

In view of the aforesaid difficulties of the conventional fiber-optic coils, it is an object of the present invention to provide a fiber-optic coil which is of a relatively simple structure, is relatively inexpensive to manufacture, suffers a minimum of output drifts, has highly stable temperature-dependent output characteristics, and can be mass-produced with a high yield at a high production rate.

Another object of the present invention is to provide a fiber-optic coil which has highly stable polarizing characteristics.

Still another object of the present invention is to provide a method of manufacturing a fiber-optic coil.

According to the present invention, there is provided a fiber-optic coil comprising a coil bobbin, and a length of optical fiber divided into a first optical fiber segment and a second optical fiber segment by a longitudinal middle portion therebetween, the first and second optical fiber segments being of equal length, the first optical fiber segment being wound as radially successive coiled layers around the coil bobbin in a first region thereof, the second optical fiber segment being wound as radially successive coiled layers around the coil bobbin in a second region thereof axially adjacent to the first region, with the longitudinal middle portion being positioned in the radially innermost coiled layers of the first and second optical fiber segments adjacent to a longitudinal center of the coil bobbin, each of the first and second optical fiber segments being wound in alternate axial directions in the radially successive coiled layers.

The first and second optical fiber segments may be integrally joined to each other across the longitudinally middle portion, whereby the length of optical fiber is continuous.

Alternatively, the first and second optical fiber segments may be separate from each other at the longitudinally middle portion, and a depolarizer may be joined between the first and second optical fiber segments across the longitudinally middle portion.

According to the present invention, there is also provided a method of manufacturing a fiber-optic coil, comprising the steps of dividing a length of optical fiber into a first optical fiber segment and a second optical fiber segment by a longitudinal middle portion therebetween, the first and second optical fiber segments being of equal length, winding the first optical fiber segment as radially successive coiled layers around a coil bobbin in a first region thereof, winding the second optical fiber segment as radially successive coiled layers around the coil bobbin in a second region thereof axially adjacent to the first region, with the longitudinal middle portion being positioned in the radially innermost coiled layers of the first and second optical fiber segments adjacent to a longitudinal center of the coil bobbin, each of the first and second optical fiber segments being wound in alternate axial directions in the radially successively coiled layers, and thereafter heating and cooling the radially successive coiled layers of the first and second optical fiber segments.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

1st Embodiment

Figure 1:
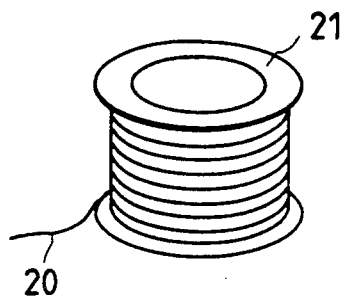
FIG. 1 is a perspective view of a continuous length of optical fiber on a bobbin, for manufacturing a fiber-optic coil according to a first embodiment of the present invention.
Figure 2:
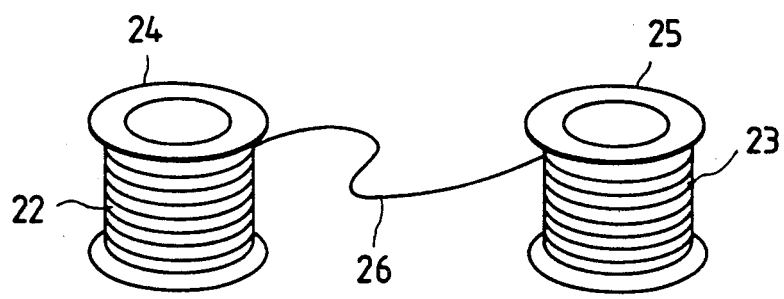
FIG. 2 is a perspective view of the continuous length of optical fiber, shown in FIG. 1, which is divided, but not separated, into first and second optical fiber segments of equal length that are wound respectively on supply bobbins.

A fiber-optic coil according to a first embodiment of the present invention is manufactured as follows:

A continuous length of optical fiber 20 (see FIG. 1) which is wound on a bobbin 21 is divided, but not separated, into first and second optical fiber segments 22, 23 (see FIG. 2) of equal length that are wound, from the opposite ends of the continuous optical fiber 20, on respective supply bobbins 24, 25. The first and second optical fiber segments 22, 23 are divided from each other at a longitudinally middle portion 26 of the continuous optical fiber 20.

Figure 3:
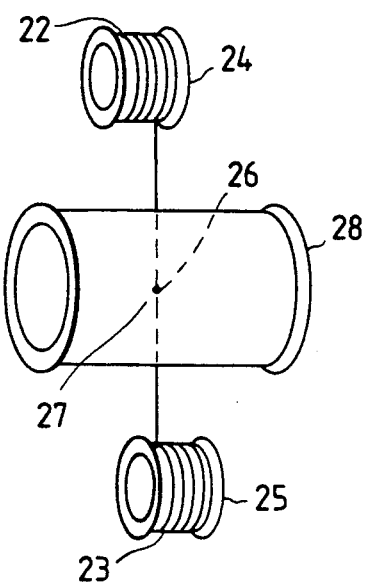
FIGS. 3, 4, and 5 are perspective views showing the manner in which a fiber-optic coil is manufactured of the first and second optical fiber segments supplied from the supply bobbins shown in FIG. 2.
Figure 4:
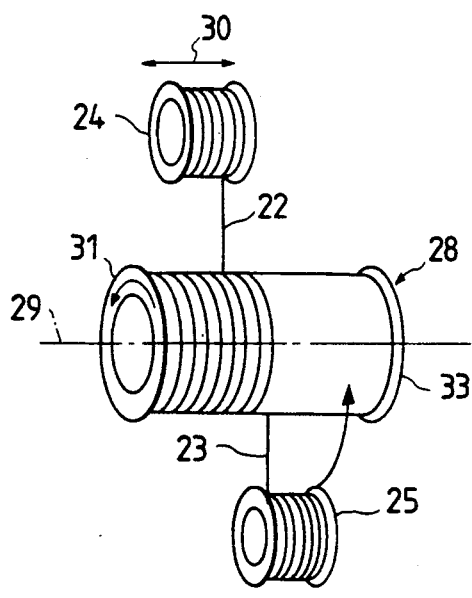

Then, these first and second optical fiber segments 22, 23 are wound on a coil bobbin 28 as shown in FIG. 3. First, as shown in FIG. 3, the middle portion 26 of the continuous optical fiber 20 is held against an axially central region 27 of a coil bobbin 28. Then, as shown in FIG. 4, the coil bobbin 28 is rotated about its own axis 29 in one direction and the supply bobbin 25 is revolved around the coil bobbin 28 in positionally fixed relationship thereto. At this time, the continuous optical fiber 20 is kept under constant tension. While the coil bobbin 28 and the supply bobbin 25 are thus being rotated, the supply bobbin 24 is axially moved back and forth in the directions indicated by the arrow 30. The axial movement of the supply bobbin 24 is effected between the axially central region 27 and one axial end 31 of the coil bobbin 28. Therefore, the first optical fiber segment 22 wound on the supply bobbin 24 is continuously supplied therefrom and wound around the coil bobbin 28 as radially successive coiled layers in an axial region between the axially central region 27 and the axial end 31. Since the first optical fiber segment 22 starts being wound on the coil bobbin 28 from the axially central region 27 toward the axial end 31 thereof, the 2(n+1)th coiled layer (n=0, 1, 2, . . . ) of the first optical fiber segment 22 is wound toward the axially central region 27, and the (2n+1)th layer of the first optical fiber segment 22 is wound toward the axial end 31.

Figure 5:
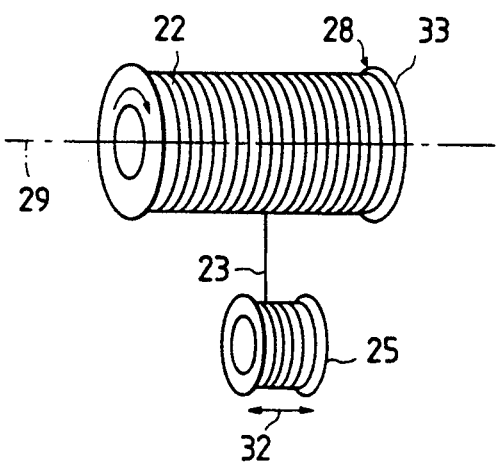

After the first optical fiber segment 22 has completely been wound around the coil bobbin 28, the end of the first optical fiber segment 22 is affixed to the coil bobbin 28. Then, as shown in FIG. 5, the coil bobbin 28 is rotated about its own axis 29 in the opposite direction, while at the same time the supply bobbin 25 is being axially moved back and forth in the directions indicated by the arrow 32. The supply bobbin 24 is axially moved between the axially central region 27 and the other axial end 33 of the coil bobbin 28. Therefore, the first optical fiber segment 23 wound on the supply bobbin 25 is continuously supplied therefrom and wound around the coil bobbin 28 as radially successive coiled layers in another axial region between the axially central region 27 and the axial end 33.

Figure 6:
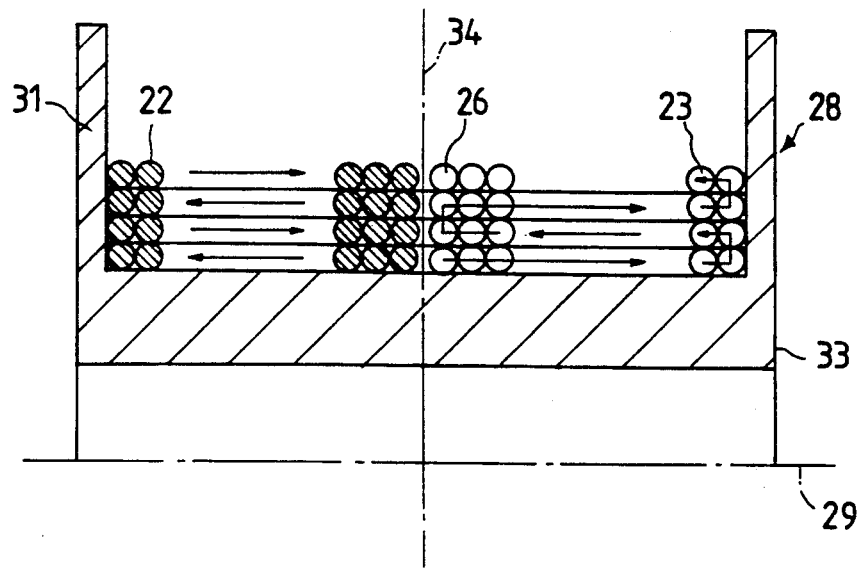
FIG. 6 is an enlarged fragmentary cross-sectional view of the fiber-optic coil manufactured as shown in FIGS. 3, 4, and 5.

FIG. 6 shows in detail the manufactured fiber-optic coil according to the first embodiment of the present invention. As shown in FIG. 6, the first optical fiber segment 22 is wound in radially successive coiled layers in the axial region between the axial end 31 of the coil bobbin 28 and an axially central plane 34 that extends radially perpendicularly to the axis 29 of the coil bobbin 28, and the second optical fiber segment 23 is wound in radially successive coiled layers in the axial region between the axial end 33 of the coil bobbin 28 and the axially central plane 34. The longitudinally middle portion 26 is positioned in the radially innermost coiled layers of the first and second optical fiber segments 22, 23 adjacent to the central plane 34. Any portions, which are equidistant from the optical fiber middle portion 26, of the coiled turns of the first and second optical fiber segments 22, 23 are spaced at equal radial distances from the axis 29 and also spaced at equal axial distances from the central plane 34. Accordingly, the first and second optical fiber segments 22, 23 are wound symmetrically with respect to the central plane 34.

The symmetrical arrangement of the first and second optical fiber segments 22, 23 reduces temperature differences between the turns thereof due to changes in the ambient temperature. In the case where the fiber-optic coil is used as the sensor coil of a fiber-optic gyroscope, the symmetrical arrangement of the first and second optical fiber segments 22, 23 is also effective to minimize a phase error in an optical interference output signal generated by the sensor coil. Therefore, the fiber-optic coil is capable of propagating lightwaves stably irrespective of changes in the ambient temperature, for increased detection sensitivity. In addition, since the first and second fiber segments 22, 23 are individually wound around the coil bobbin 28, the fiber-optic coil can simply be manufactured relatively inexpensively.

The coil bobbin 28 is made of Kovar, stainless steel, or the like. However, the coil bobbin 28 may be made of any material which is highly thermally conductive. The highly thermally conductive coil bobbin 28 also allows the fiber-optic coil to produce a highly stable output signal irrespective of ambient temperature changes.

Figure 7:
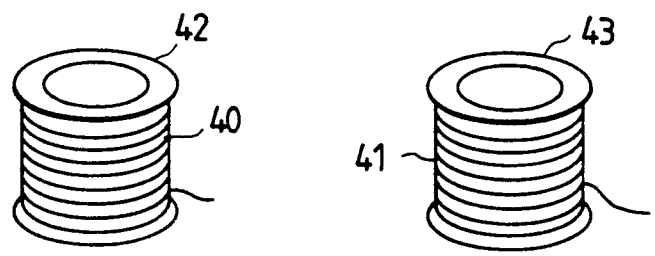
FIG. 7 is a perspective view of separate first and second optical fiber segments of equal length that are wound respectively on supply bobbins, for manufacturing a fiber-optic coil according to a second embodiment of the present invention.
Figure 8:
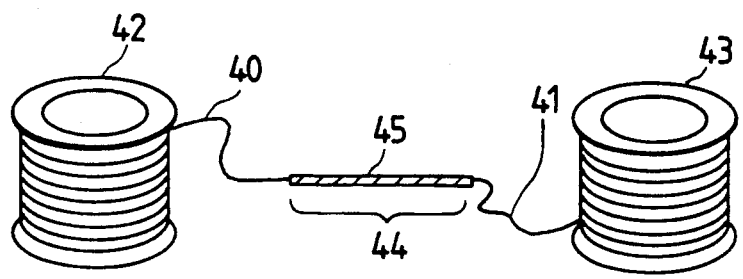
FIG. 8 is a perspective view of the separate first and second optical fiber segments, shown in FIG. 7, that are connected to each other by a depolarizer.

In FIG. 6, the optical fiber middle portion 26 is shown as being positioned immediately on the righthand side of the central plane 34. However, the optical fiber middle portion 26 may be positioned immediately on the lefthand side of the central plane 34, or may be positioned on the central plane 34. 2nd Embodiment:

FIG. 7 shows separate first and second optical fiber segments 40, 41 of equal length that are wound respectively on supply bobbins 42, 43, for manufacturing a fiber-optic coil according to a second embodiment of the present invention. As shown in FIG. 8, the ends of the first and second optical fiber segments 40, 41 are joined to each other by an optical fiber depolarizer 44. Specifically, the depolarizer 44 has opposite ends joined to the ends of the first and second optical fiber segments 40 41 by a fusion splice. Therefore, the longitudinal center of the depolarizer 44 is positioned at a longitudinal middle portion 45 of a joined length of the first and second optical fiber segments 40, 41.

The first and second optical fiber segments 40, 41 are wound around a coil bobbin 46 (see FIG. 9) in the same manner as shown in FIGS. 3 through 4, except that the middle portion 45 of the joined optical fiber length, i.e., the center of the depolarizer 44, is held against the axial central region of the coil bobbin 46.

Figure 9:
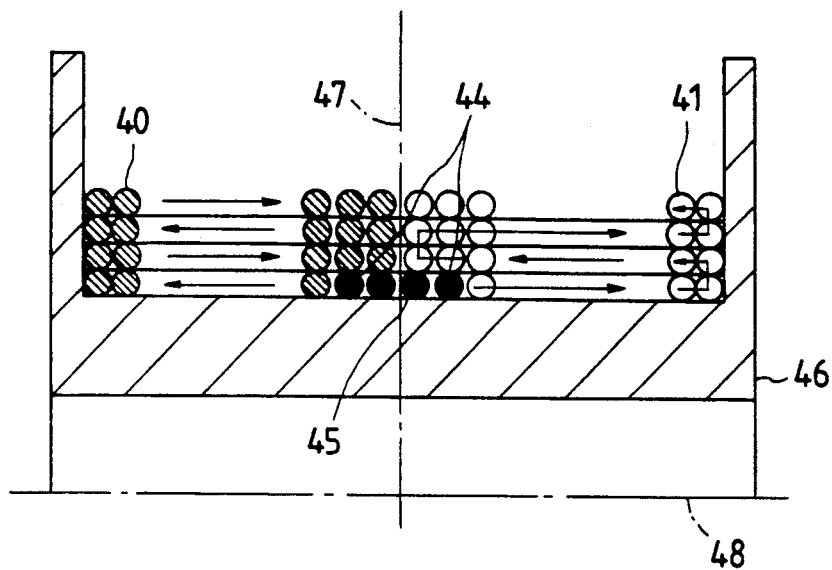
FIG. 9 is an enlarged fragmentary cross-sectional view of a fiber-optic coil manufactured of the first and second optical fiber segments supplied from the supply bobbins shown in FIG. 8.
Figure 10:
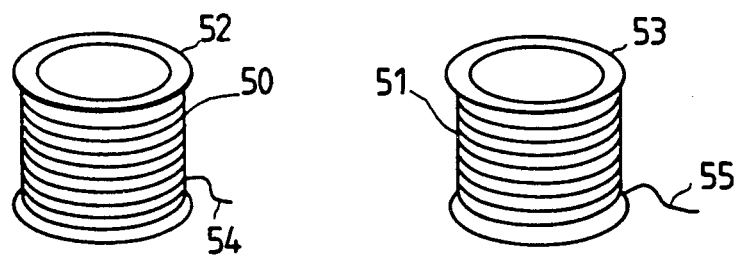
FIG. 10 is a perspective view of separate first and second optical fiber segments of equal length that are wound respectively on supply bobbins, for manufacturing a fiber-optic coil according to a third embodiment of the present invention.
Figure 11:
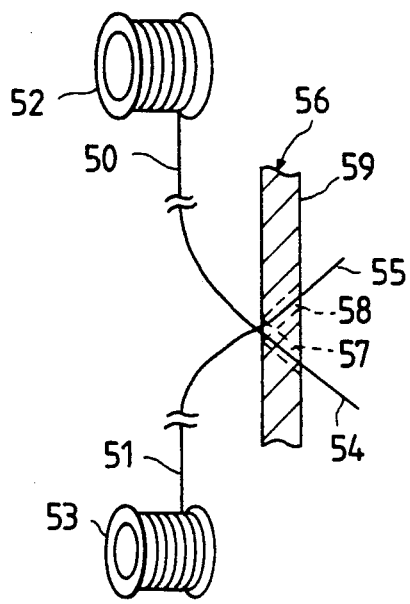
FIG. 11 is a perspective view showing the manner in which a fiber-optic coil is manufactured of the first and second optical fiber segments supplied from the supply bobbins shown in FIG. 10.

FIG. 9 shows the manufactured fiber-optic coil with the depolarizer 44 positioned in the radially innermost coiled layers of the first and second optical fiber segments 40, 41 across the central plane 47 perpendicular to the axis 48 of the coil bobbin 46. The depolarizer 44 serves to control the plane of polarization of a lightwave propagating through the first and second optical fiber segments 40, 41. 3rd Embodiment:

FIG. 10 shows separate first and second optical fiber segments 50, 51 of equal length that are wound respectively on supply bobbins 52, 53, for manufacturing a fiber-optic coil according to a third embodiment of the present invention. The first and second optical fiber segments 50, 51 have respective ends 54, 55. In a manufacturing process, the ends 54, 55 of the first and second optical fiber segments 50, 51 are first inserted into a coil bobbin 56 (see FIG. 11) through respective holes 57, 58 defined in a cylindrical wall 59 of the coil bobbin 56. Then, the first and second optical fiber segments 50, 51 are wound around the coil bobbin 56 in the same manner as shown in FIGS. 3 through 4, except that the coil bobbin 56 is rotated about its own axis in one direction only irrespective of whether the first optical fiber segment 50 or the second optical fiber segment 51 is wound about the coil bobbin 56.

Figure 12:
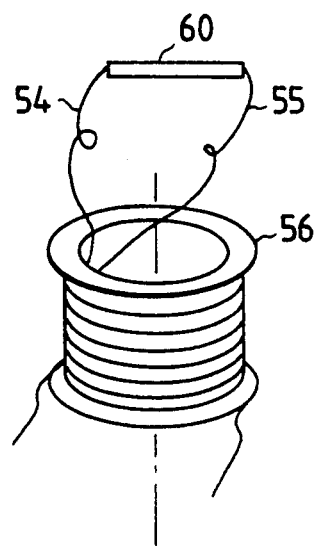
FIG. 12 is a perspective view of the manufactured fiber-optic coil according to the third embodiment.

After the first and second optical fiber segments 50, 51 have been wound around the coil bobbin 56, an optical fiber depolarizer 60 is joined between the ends 54, 55 by a fusion splice as shown in FIG. 12. The depolarizer 60 thus joined is positioned at a longitudinal middle portion of a joined length of the first and second optical fiber segments 50, 51. Then, the depolarizer 60 is coiled and stored in a recess 61 defined in the inner surface of the cylindrical wall 59 of the coil bobbin 56, i.e., the depolarizer 60 is positioned radially inwardly of the cylindrical wall 59, as shown in FIG. 13.

Figure 13:
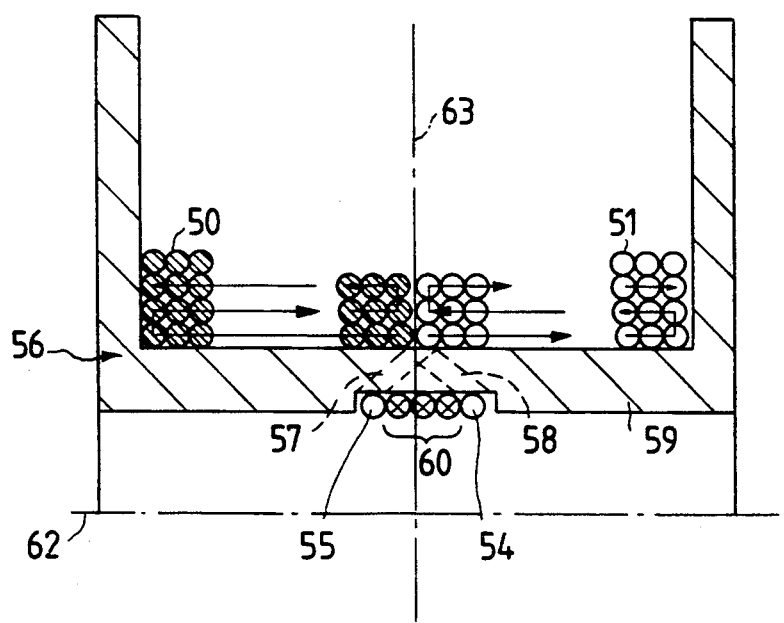
FIG. 13 is an enlarged fragmentary cross-sectional view of the manufactured fiber-optic coil shown in FIG. 12.

As shown in FIG. 13, the holes 57, 58 extend obliquely to the axis 62 of the coil bobbin 56 and are positioned one on each side of the central plane 63 perpendicular to the axis 62. The recess 61 is positioned across the central plane 63.

Figure 14:
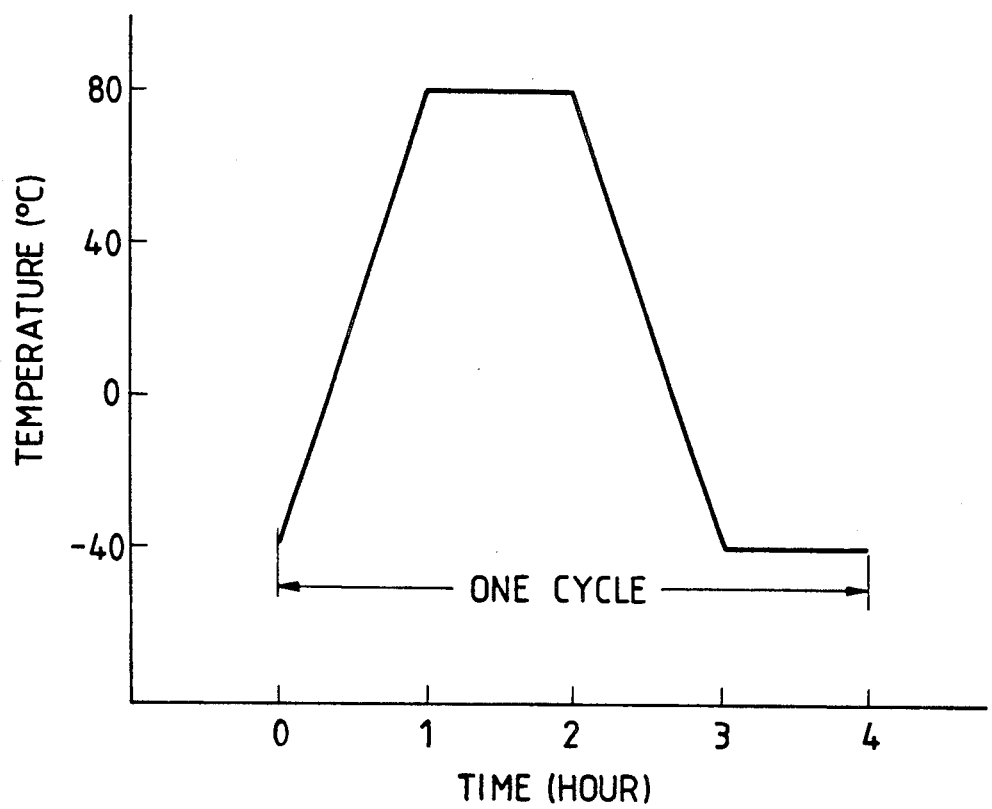
FIG. 14 is a timing chart of a cycle of heating and cooling a fiber-optic coil.

In each of the above embodiments, the manufactured fiber-optic coil is heated and cooled in a cycle of four hours as shown in FIG. 14. More specifically, the fiber-optic coil is heated from −40° C. to 80° C. for one hour, then maintained at 80° C. for one hour, thereafter cooled from 80° C. to −40° C. for one hour, and finally maintained at −40° C. for one hour. However, the fiber-optic coil may be heated up to 130° C., and may be cooled down to −50° C. in the cycle.

The heating/cooling cycle is effective to uniformize temperatures and residual stresses to which the fiber-optic coil is subjected.

An experiment was conducted on a fiber-optic coil to determine the effects of the heating/cooling cycle described above. The results of the experiment indicated that the stability of the polarizing characteristics of the fiber-optic coil after it had been subjected to the heating/cooling cycle was increased about 5 dB compared with the stability of the polarizing characteristics of the fiber-optic coil before the heating/cooling cycle. It was also found that some fiber-optic coils manufactured by certain methods exhibited higher polarizing stability as they underwent a greater number of heating/cooling cycles.

In each of the above embodiments, the optical fiber or the first and second optical fiber segments may be of the type which maintains the plane of polarization of a propagating lightwave, or may be an ordinary single-mode optical fiber particularly in the case where the fiber-optic coil is used as the sensor loop of a fiber-optic gyroscope.

Although certain perferred embodiments of the present invention have been shown and described in detail, it should be understood that various changes and modifications may be made therein without departing from the scope of the appended claims.

What is claimed is:

1. A fiber-optic coil comprising:
    a coil bobbin;
    a length of optical fiber divided into a first optical fiber segment and a second optical fiber segment by a longitudinal middle portion therebetween, said first and second optical fiber segments being of equal length; and
    said first optical fiber segment being wound as radially successive coiled layers around said coil bobbin in a first region thereof, said second optical fiber segment being wound as radially successive coiled layers around said coil bobbin in a second region thereof axially adjacent to said first region, with said longitudinal middle portion being positioned in the radially innermost coiled layers of the first and second optical fiber segments adjacent to a longitudinal center of said coil bobbin, each of said first and second optical fiber segments being wound in alternate axial directions in said radially successive coiled layers.

2. A fiber-optic coil according to claim 1, wherein said coil bobbin is made of a thermally conductive material.

3. A fiber-optic coil according to claim 1, wherein said first and second optical fiber segments are integrally joined to each other across said longitudinally middle portion, whereby said length of optical fiber is continuous.

4. A fiber-optic coil according to claim 1, wherein said first and second optical fiber segments are separate from each other at said longitudinally middle portion.

5. A fiber-optic coil according to claim 4, further including a depolarizer joined between said first and second optical fiber segments across said longitudinally middle portion.

6. A fiber-optic coil according to claim 5, wherein said depolarizer is disposed across said longitudinal center of the coil bobbin.

7. A fiber-optic coil according to claim 5, wherein said depolarizer is disposed in said radially innermost coiled layers of the first and second optical fiber segments.

8. A fiber-optic coil according to claim 5, wherein said coil bobbin has a cylindrical wall on which said radially successively coiled layers are disposed, said cylindrical wall having a pair of holes defined therein, said first and second optical fiber segments having ends inserted through said holes, respectively, said depolarizer being joined to said ends radially inwardly of said cylindrical wall.

9. A fiber-optic coil according to claim 8, wherein said cylindrical wall has a recess defined in an inner surface thereof, said depolarizer being positioned in said recess.

10. A fiber-optic coil according to claim 1, wherein said length of optical fiber comprises a single-mode optical fiber.

11. A method of manufacturing a fiber-optic coil, comprising the steps of:
    dividing a length of optical fiber into a first optical fiber segment and a second optical fiber segment by a longitudinal middle portion therebetween, said first and second optical fiber segments being of equal length;
    winding said first optical fiber segment as radially successive coiled layers around a coil bobbin in a first region thereof;
    winding said second optical fiber segment as radially successive coiled layers around said coil bobbin in a second region thereof axially adjacent to said first region, with said longitudinal middle portion being positioned in the radially innermost coiled layers of the first and second optical fiber segments adjacent to a longitudinal center of said coil bobbin, each of said first and second optical fiber segments being wound in alternate axial directions in said radially successively coiled layers; and
    thereafter heating and cooling said radially successive coiled layers of the first and second optical fiber segments.

12. A method according to claim 11, wherein said radially successive coiled layers of the first and second optical fiber segments are heated up to 130° C. and cooled down to −50° C.

13. A method according to claim 11, further including the step of;
    supplying said first and second optical fiber segments from respective supply bobbins while the first and second optical fibers are being wound around said coil bobbin.

14. A method according to claim 13, wherein said second optical fiber is wound around said coil bobbin after said first optical fiber is completely wound around said coil bobbin.

15. A method according to claim 13, further including the step of:
    rotating said coil bobbin about its own axis while axially moving said supply bobbins while the first and second optical fibers are being wound around said coil bobbin.

16. A method according to claim 11, further including the step of:
    joining a depolarizer between said first and second optical fiber segments before the first and second optical fibers are wound around said coil bobbin.

17. A method according to claim 11, further including the step of:
    joining a depolarizer between said first and second optical fiber segments after the first and second optical fibers are wound around said coil bobbin.

* * * * *